(12) United States Patent
Song

(10) Patent No.: US 7,760,649 B2
(45) Date of Patent: *Jul. 20, 2010

(54) OPPORTUNISTIC WIRELESS MESH NETWORK METHODS

(75) Inventor: Liang Song, Toronto (CA)

(73) Assignee: Sennet Communications, Toronto, Ontario (CA)

( * ) Notice: Subject to any disclaimer, the term of this patent is extended or adjusted under 35 U.S.C. 154(b) by 344 days.

This patent is subject to a terminal disclaimer.

(21) Appl. No.: 11/902,411

(22) Filed: Sep. 21, 2007

(65) Prior Publication Data

US 2008/0075010 A1    Mar. 27, 2008

Related U.S. Application Data

(60) Provisional application No. 60/846,332, filed on Sep. 22, 2006.

(51) Int. Cl.
    H04L 12/28    (2006.01)
(52) U.S. Cl. ........................ 370/238; 370/329
(58) Field of Classification Search ................ 370/238, 370/238.1, 338, 390, 432, 252, 328, 329, 370/311, 312, 392
    See application file for complete search history.

(56) References Cited

U.S. PATENT DOCUMENTS

2006/0068795 A1*  3/2006  Caspi et al. ................. 455/445
2006/0159101 A1*  7/2006  Turk ........................ 370/395.2
2006/0182093 A1*  8/2006  Nurnberger et al. ......... 370/352
2006/0209792 A1*  9/2006  Nurnberger ................. 370/352

* cited by examiner

Primary Examiner—Brian D Nguyen
(74) Attorney, Agent, or Firm—Freedman & Associates

(57) ABSTRACT

The invention relates to opportunistic wireless mesh networks which operate under random networking conditions. Such random network conditions typically limit the effectiveness of prior art wireless mesh networks, and more particularly to those supporting low power devices within the wireless network. Random network conditions include: random power supply, random node distribution, random node mobility, high mobility of nodes, random wireless link fluctuations, and random application traffic. The opportunistic wireless mesh network utilizes a two-layer architecture Embedded Wireless Interconnect (EWI) framework, which is adopted as the architecture reference model. A mesh network according to the invention supports opportunistically determining both mesh interconnections and network transmission routes by providing nodes with broadcast modules and unicast modules. The methods provide novel low power opportunistic wireless mesh networks that support interconnection with existing network infrastructures such as Open System Interconnect (OSI) based wired or wireless networks. Network embodiments provide protocol translation at network borders to allow micro- and macro-mobility management for wireless devices and their associated users. Additionally embodiments of the opportunistic wireless mesh networks address reduction in power consumption.

25 Claims, 11 Drawing Sheets

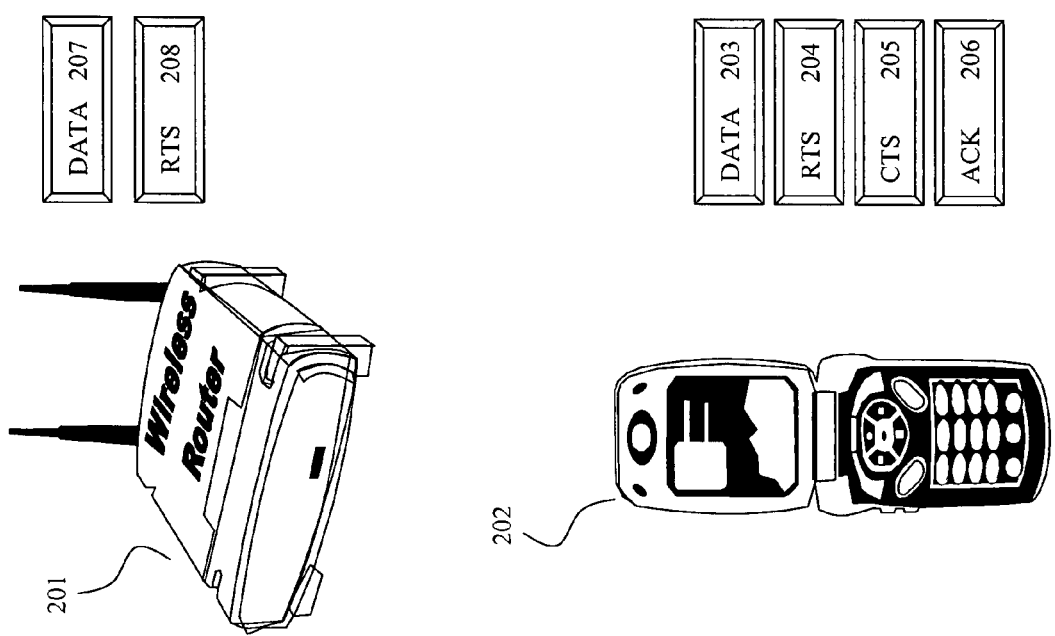

OPPORTUNISTIC WIRELESS MESH NETWORK METHODS

This application claims the benefit of U.S. Provisional Patent Application No. 60/846,332 filed Sep. 22, 2006, the entire contents of which are incorporated herein by reference.

FIELD OF THE INVENTION

The invention relates the field of wireless networking and communications. In particular, the randomness of networking conditions is handled opportunistically to achieve reliable and high-performance data communications.

BACKGROUND OF THE INVENTION

Large-scale communication networks are typically supported by an infrastructure, which supports communication between distant individuals, for example the regular mail system, the telephone or electronic message system. In such communication networks, when a person dials a number or writes an address, the phone call, the letter or the electronic mail message is sent through an organized structure, which allows the path of the message to be predetermined, and hence tracked and managed, until it reaches its destination. The construction of such infrastructure necessitates high capital cost expenditure, long-term planning and international compatibility between materials and processors having different origins to be able to connect together and provide the expected connections and services.

To provide more latitude to users and to increase the communication capabilities between people, cellular networks were established providing mobility to the user whilst at least maintaining centralized management and message routing. When a cellular telephone is used, there must be "towers" or antennas that transmit and receive signals from each cellular telephone. Current cellular telephone networks typically transmit over a long distance to a cellular tower, and cellular phones transmit and receive information from the receiver tower, which is located, many hundreds of meters away. This requires an initial infrastructure investment before cellular telephones function adequately with reasonable areas of coverage. Further changing technologies are more difficult to implement due to the lag time associated with infrastructure roll-out and the balancing of infrastructure costs versus cost recovery. Despite these wireless infrastructure now supports a wide range of wireless devices from cellular telephones to PDAs. Additionally cellular wireless networks are now augmented with localised wireless networks for computers, laptops etc as well as personalised wireless infrastructures such as "Bluetooth"™ headsets, microphones etc.

Existing infrastructures for wireless networks have also evolved over time to today's wireless mesh network architectures and have traditionally adopted the Open System Interconnect (OSI) reference model, which has been popular in wired networks and as such provides a familiar model to network operators as well as allowing the merging of wired and wireless infrastructure/networks. Within this model, the wireless links between wireless nodes within range of each other form a network topology graph, and the multiple links from each individual node to neighboring nodes form the basis of the mesh, as opposed to previous single hop connections of nodes in star-like networks. Examples of this include the municipal WiFi (IEEE 802.11) mesh networks currently being deployed within a number of cities across North America, including San Francisco, Chicago, Miami and Annapolis.

By adopting the OSI reference mode the networking architecture is divided into multiple hierarchical layers, including the physical layer which transforms the digital bits into analog radio waves, and vice versa, and is the most tangible to the users as it's in their hands or in the environment around them. However, it is the intangible layers, such as the Medium Access Control (MAC) layer which actually sets up virtual wired links over wireless medium by means of interference control, and the Link Logic Control (LLC) layer that performs additional functionalities of the link layer, including multiplexing and demultiplexing protocols using the MAC layer, that actually provide the operational control and management of the wireless network and the transmission of information across it. The network layer of every node acts as a router, where the routing table is maintained to find the source to destination paths over available wireless links, and from the available options provides the information allowing the transport layer to set up an end-to-end tunnel from the source to the destination, transmitting the information through this end-to-end tunnel and hiding these networking complexities from the application layer and therein the user.

In today's real world, the demands of deploying wireless mesh infrastructure within dense urban environments, environmental issues over placement and power of antennas, physiological issues of prolonged human tissue exposure to wireless transmitter signals, and the everlasting consumer demands for more functionality, smaller, lighter, cheaper, long battery life, worldwide roaming, and future-proof electronics results in the need for networks with tens of millions of lightweight wireless nodes being in communication. Further these lightweight wireless nodes can be mobile, of varying power status and seeking/providing random application traffic.

As a result, the prior art infrastructure solutions have been shown to be incapable in handling the randomness in large scale wireless meshing networking with lightweight nodes. Such randomness arising from many conditions, of which some under consideration here include: random power supply, random node distribution and mobility, random wireless link fluctuation, and random application traffic. It would be evident to those skilled in the art that many other conditions give rise to randomness within the network, and whilst not explicitly defined give rise to similar issues in network management and service provisioning. The specifically identified challenges above are individually commented upon briefly below.

Random power supply suggests that sustainable power might be unavailable to the nodes, i.e. via wired power line. The volatility of the power supply exhibits itself in the variety of environmental power scavenging schemes, such as reviewed by S. Roundy et al "Power Sources for Wireless Sensor Networks" Proceed. European Workshop on Wireless Sensor Networks 2004, including but not limited to photovoltaic cells, acoustics, wind etc. Whenever a node (temporarily) runs out of power, the network topology is changed. Therefore, sophisticated network management and routing protocol are needed, at the network layer, in order to track the topology change, which typically requires a lot of processing and memory resources for the implementation. The utilizing of high-end processors, as well as large memory storage devices, exacerbates high power consumption of the nodes.

Random node distribution or mobility further suggests that the mesh network topology is random, and may frequently change. In large-scale networks, it is difficult for an individual node to acquire and maintain the network wide topology knowledge, so as to achieve effective network routing. Similar to the randomness in power supply, sophisticated network protocols are needed for handling the topology uncertainty, which can be infeasible for lightweight (low power) nodes, as well as where timescales of topology changes are faster than network protocols of network discovery provide updates or where the changes are occurring to a large number of nodes at any point instant.

Random wireless link fluctuation is typical in wireless networks and is due to the multi-path fading in radio wave propagations. Prior art solutions generally use link layer error control and retransmission to compensate the link fluctuation, which introduces large latency and power consumption. Alternatively D. Srikrishna et al in U.S. Pat. No. 7,058,021 presents an approach wherein a node chooses preferentially links with higher packet success ratio, at the routing protocol of network layer. The method needs a period of time to calculate the packet successful ratio, and hence is unable to deal with short-term multi-path fading under consideration here as well as high node mobility. Moreover, the test packets for calculating the packet success ratio also consume a large amount of overhead.

Random application traffic can result in network congestions. In prior art solutions the network layer drops overflowed packets, due to the congestion, by queuing management protocols. The transport layer limits the application traffic, on detecting the packet loss due to congestions. When random traffics are present, it is difficult to design routing protocols, avoiding the network congestions by adaptive routing paths selection. It is even more difficult to design such protocols with fast reaction and low overheads consumption. It is also difficult to detect the congestions at the transport layer, since packet losses can be due to the wireless link fluctuations, or inappropriate routing paths.

It is therefore desirable to design a lightweight mesh networking architecture and the associated wireless techniques, which can efficiently handle randomness in large-scale mesh networking, and achieve high performance data communications.

SUMMARY OF THE INVENTION

The invention addresses the requirements of providing highly opportunistic and self-organizing wireless mesh network architectures with light-weight wireless nodes. The invention also presents preferred methods and apparatus for use in conjunction with the wireless nodes to implement such highly opportunistic and self-organizing wireless mesh networks with minimum overheads. The invention overcomes the inefficiency of the prior art in dealing with the random networking conditions. Higher performance is achieved by opportunistically exploiting the random networking conditions.

The adopted networking architecture is based upon a reference model entitled Embedded Wireless Interconnect (EWI), which was introduced in the work of Liang Song and Dimitrios Hatzinakos (see for example "Embedded Wireless Interconnect for Sensor Networks Concept and Example," in Proc. IEEE Consumer Communications and Networking Conference, Las Vegas, Jan. 10-12, 2007). A differentiation of EWI from the prior art is the redefinition of wireless link, where the term "abstract wireless link" is coined to define an arbitrary abstraction of cooperation between proximate wireless nodes, as opposed to traditional point-to-point virtual-wired wireless link. "Wireless link modules" are then defined as the building blocks at wireless nodes which can implement different kinds of abstract wireless links. The EWI is composed of two layers, which are the System layer (SL) and the Wireless Link layer (WL) respectively. The WL supplies a set of wireless link modules, which the SL can utilize to achieve application specific networking. Within the current invention of opportunistic mesh networks, two different types of wireless link modules are utilized in an Opportunistic Mesh Wireless Link layer (OMWL), where these two utilized wireless link modules are a broadcast module and a unicast module, respectively. Therefore, the essence of "opportunistic" suggests that: 1) the participating nodes of an abstract wireless link are opportunistically decided by autonomous node availability; 2) the use of wireless link modules is determined opportunistically based upon current local networking conditions.

The design of the wireless link modules in OMWL, i.e. the broadcast module and the unicast module, is dependent on the specific physical radio implementations and channel assignment techniques, so as to provide the opportunistic mesh networks. One particular embodiment could include the use of a data radio with multiple narrowband channels, and a separate busy tone radio. The multiple narrowband data channels being utilized for supporting co-located parallel wireless transmissions. Every data channel is assigned two distinctive busy tones, which are the transmitter tone and the receiver tone, respectively. The transmitter tone being used by the transmitter to indicate the pending transmission on the data channel to a set of receivers; and the receiver tone being used by the receiver for the purpose of interference control. Yet another embodiment uses one single data radio with a wideband channel, where the signal signatures, e.g., code spreading or time/frequency hopping sequences, are utilized to differentiate co-located parallel wireless transmissions. The transmitter indicates the pending transmission to a set of receivers by padding a period of preamble tone before the transmission.

The cited opportunistic mesh wireless link layer and the associated mesh networking architecture can interconnect existing OSI based packet-switch wired and wireless infrastructure, by applying suitable protocol translations at the network borders (i.e., gateways). The aforementioned existing OSI based wireless infrastructure can support data, voice and other services; examples include but are not limited to:

WIFI [ANSI/IEEE Standard 802.11, "Wireless LAN Medium Access Control (MAC) and Physical Layer (PHY) Specifications," Reaffirmed 2003];

WIMAX [IEEE Standard 802.16, "Air Interface for fixed Broadband Wireless Access Systems," 2004];

BLUETOOTH [IEEE Standard 802.15.1, "Wireless Medium Access Control (MAC) and Physical Layer (PHY) Specifications for Wireless Personal Area Networks (WPANS)," Reaffirmed 2005]; and ZIGBEE [IEEE Standard 802.15.4, "Wireless Medium Access Control (MAC) and Physical Layer (PHY) Specifications for Low-Rate Wireless Personal Area Networks (LR-WPANs)," 2003].

Additionally the links can be based upon Internet Protocols (IP) or be satellite links. The aforementioned wired infrastructure can be based upon protocols including but not limited to:

ETHERNET [IEEE Standard 802.3, "Carrier Sense Multiple Access with Collision Detection (CSMA/CD) Access Method and Physical Layer Specifications," 2002];

Token Ring (IEEE 802.5) [IEEE Standard 802.5, "Token Ring Access Method and Physical Layer Specifications," 2000]; and FDDI (Fiber distributed data interface) [American National Standard, ANSI X3.139, "Fiber Distributed Data Interface (FDDI)—Token Ring Media Access Control (MAC)," 1987].

The advantages of the present invention in dealing with random networking conditions will be apparent in the detailed descriptions presented subsequently. In summary, the troublesome randomness, e.g. introduced by random power supply and random node distribution, is resolved in the invention, by removing the requirement deterministic network topology.

The functionalities of DATA packet forwarding are integrated in the design of the unicast wireless link modules requiring only local address information, whereas the participating nodes are determined opportunistically by the node autonomous availability. The next hop relay node in a DATA packet path is then decided opportunistically, for example by the combination metrics of node address and wireless link status. As such, the random channel fluctuation is utilized opportunistically for improved performance. And the best node among the relay candidates, in terms of the lowest DATA packet delivery cost (DPC), for example, to the destination, can be opportunistically selected as the next hop relay node.

Network congestions, introduced by the random application traffic, can then be readily detected and avoided, by examining whether the previous DATA packet has been sent out, since the OMWL is directly exposed to SL. The traditional network queuing management in the OSI network layer is not necessary in the OMWL, and the OMWL can process the module of one DATA packet at any given time, in an embodiment of the current invention as described. The SL can utilize the detected congestion to limit the application traffics. Therefore, the functionalities of network queuing are achieved automatically, in a simple way, by using the multiple-node redundancy in the network, which virtually transforms the network queuing concept to the queuing in network.

Since the randomness in the wireless network is exploited opportunistically, the invention provides for reliable high performance networking over lightweight nodes, in terms of high throughput, low latency, low jitter, and can accommodate a variety of applications, including video and voice over IP (VoIP). The Quality of Services (QoS) of wireless traffics can be configured via the parameter setting of corresponding wireless link modules, e.g., by adjusting transmitter output power and/or data rate. All of these benefits being achieved under conditions that can include the mobility of nodes with a highly "fluid" mesh.

According to an embodiment of the invention there is provided a method of opportunistic data communications comprising the steps of:

providing a data packet to a first node for transmission therefrom, the first node being identified by a first address;

providing a plurality of second nodes; each second node being identified by a second address;

providing an indication of the destination address of the data packet;

determining at least an indication of a cost of data delivery to each second node within a current subset of the plurality of second nodes;

determining opportunistically for the data packet whether to at least one of broadcast and unicast from the first node; wherein, upon determining to broadcast from the first node, broadcasting the data packet upon at least a wireless channel; and upon determining to unicast from the first node, determining opportunistically at least one second node of the current subset of the plurality of second nodes to transmit the data packet to based upon a predetermined cost decision and transmitting the data packet from the first node to the at least one second node upon at least a wireless channel.

In accordance with another embodiment of the invention there is provided a method of opportunistic data communications comprising the steps of:

providing a node of a plurality of nodes, each nodes identified by an address and capable of wirelessly communicating by at least one of transmitting and receiving a data packet upon one channel of a plurality of channels according to at least a standard and at least one of transmitting and receiving a pilot tone of a plurality of pilot tones;

receiving at the node a data packet for transmission, the data packet having associated a destination address other than the address of the node;

transmitting an indication of the availability of the data packet for transmission from the node using a first pilot tone, the pilot tone associated with at least one of the first node and the one channel;

receiving an indication of an availability to receive the data packet from at least a second other node of the plurality of nodes, the availability indicated by receiving at least one of a second pilot tone and the address of the second other node, the second pilot tone associated with at least one of the second other node and the one channel;

providing at least one of an indication of an address and an indication of mobility associated with the at least a second other node of the plurality of nodes;

determining at least an indication of a cost of data delivery to at least each available second node within a current subset of the plurality of second nodes in dependence upon at least one of the address indication and mobility indication; and determining opportunistically an action for the node for that data packet, the action one of broadcasting, unicasting, discarding, and temporarily storing the data packet; wherein broadcasting the data packet upon at least the one channel upon determining opportunistically to broadcast without at least one of regard to and knowledge of the addresses of the plurality of nodes;

unicasting the data packet upon at least the one channel upon determining opportunistically to unicast, the unicast being to at least one second other node of the plurality of nodes in dependence upon at least one of a predetermined cost decision and a declared availability;

discarding the data packet upon determining opportunistically to discard the data packet, the determination based upon the cost of data delivery to any available second other nodes exceeds available funds; and temporarily storing the data packet upon determining opportunistically to store the data packet for a predetermined period of time, the predetermined period of time established in dependence upon at least one of lowering the cost of data delivery to a selected second other node at least one of further and to below available funds.

In accordance with another embodiment of the invention there is provided a method of opportunistic data communications comprising the steps of:

providing a node of a plurality of nodes supporting transmission of at least a data packet on at least one data channel of a plurality of data channels according to a standard and capable of bidirectional communications relating to node status upon at least one message channel of a plurality of message channels, each message channel other than one of the plurality of data channels;

monitoring a predetermined set of the message channels to provide an indication of activity;

receiving a data packet for communication from the node;

transmitting the data packet according to the standard upon the indication of activity meeting a first predetermined criterion without regard to the plurality of message channels;

transmitting the data packet according to an opportunistic method upon the indication of activity meeting a second predetermined criterion, the opportunistic method including a decision as to whether at least one of opportunistically broadcast and opportunistically unicast from the node for the data packet; wherein, opportunistically broadcasting comprises broadcasting the data packet without at least one of regard to any addresses of the plurality of nodes and knowledge of the plurality of second addresses upon at least a data channel; and opportunistically unicasting comprises determining at least one other node of the current plurality of nodes to transmit the data to based upon a determined cost of data delivery to the one other node meeting a predetermined cost decision and transmitting the data packet from the node to the at least one determined other node upon at least a data channel.

BRIEF DESCRIPTION OF THE DRAWINGS

Embodiments of the invention will now be described in conjunction with the following drawings, in which:

FIG. 2B shows embodiments of two modules for the opportunistic mesh wireless layer.

DETAILED DESCRIPTION OF EMBODIMENTS OF THE INVENTION

Figure 1:
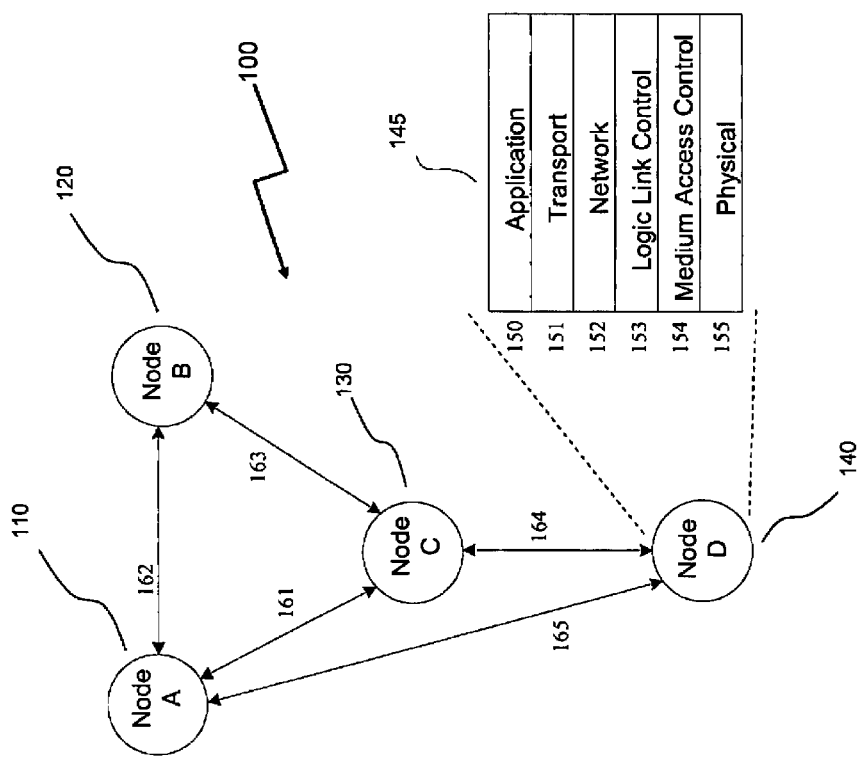
FIG. 1 shows a prior art of wireless mesh networking.

FIG. 1 illustrates a prior art example of wireless mesh networking by use of a network topology graph 100. Shown are wireless links 161 through 165, which connect four wireless network nodes, being Node A 110, Node B 120, Node C 130, and Node D 140, all of which are within acceptable transmission range of each other. This combination of wireless links (161 to 165) and nodes (110 to 140) forms a network topology graph 100. By adopting the OSI model, the networking architecture is divided into multiple hierarchical layers, shown in 145. In particular, the Physical Layer 155 transforms the digital bits into wireless signals, and vice versa. The Medium Access Control (MAC) layer 154 sets up virtual wired links over wireless medium, by means of interference control. The Link Logic Control (LLC) layer 153 performs some additional functionalities of the link layer, including multiplexing and demultiplexing protocols using the MAC layer. The Network Layer 152 of every node acts as a router, where the routing table is maintained to find the source to destination paths over available wireless links. Overlaid onto these layers 152 through 155 are the Transport Layer 151 and Application Layer 150.

Now consider a requirement to transmit a data packet from the Node D 140 to Node A 110. The network layer 152 of the node D 140 needs to decide whether to take the direct path using wireless link 165 from node D 140 to Node A 110, or take a two-hop path using wireless links 164 and 161 through the relay Node C 130. The transport layer 151 sets up an end-to-end tunnel from the source (Node D 140) to the destination (Node A 110), and hides the networking complexity from the application layer 150.

Figure 2A:
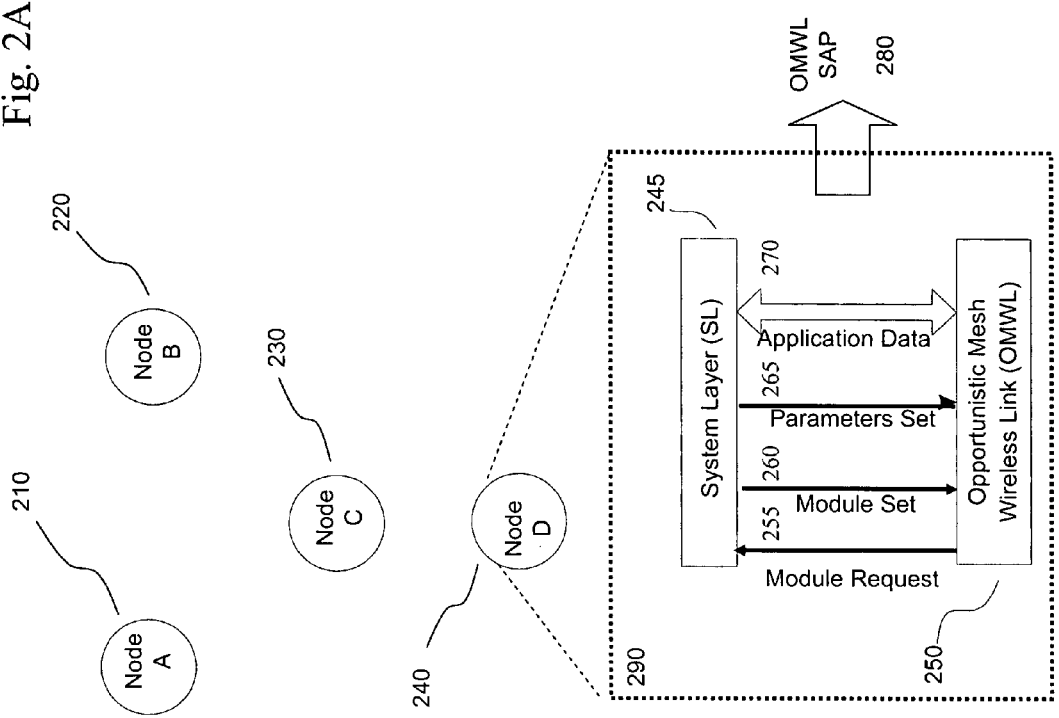
FIG. 2A shows a preferred embodiment of the opportunistic wireless mesh networking architecture.

FIG. 2A shows a preferred embodiment of the opportunistic wireless mesh networking architecture. Again, similarly to FIG. 1 four wireless nodes, Node A 210, Node B 220, Node C 230 and Node D 240 are used for the illustration. As shown in FIG. 2A, no predetermined point-to-point links or topology is maintained for the network. Now considering a request to transmit a packet of DATA from Node D 240 to Node A 210 then shown is the opportunistic mesh network architecture 290 for the Node D 240. The opportunistic mesh networking architecture 290 at Node D is divided into two layers, which are the System Layer (SL) 245 and the Opportunistic Mesh Wireless Link (OMWL) 250, respectively. The OMWL 250 supplies two different kinds of wireless link modules, which are the broadcast module and the unicast module, respectively but which are not shown in FIG. 2A for clarity.

Each of the Nodes A through D (210 through 240) in the opportunistic mesh network has a local OMWL address. In an embodiment of the invention, a requirement on the OMWL address definition is that given the OMWL addresses of any two arbitrary nodes a node may calculate a DATA packet delivery cost (DPC), the DPC indicating the cost of sending that DATA packet between the two nodes. In an embodiment, the OMWL address can be the location coordinates of the node, where the associated DPC is the distance between the source and the destination. In another embodiment, the OMWL address can be an application specific parameter, such that the associated DPC is the data gradient, proportional to the distance between the source and the destination. In yet another embodiment, the OMWL address can be the logic coordinates such as the expected numbers of wireless hops to a set of landmarks, and the associated DPC is the expected number of hops between the source and the destination.

In order to acquire the local OMWL address at a node, in one embodiment, if the node mobility is negligible, the OMWL address could be pre-configured on node deployment. In another embodiment, if the OMWL address is defined as the node location, and can be acquired and dynamically updated by a GPS (Global Position System) receiver. In yet another embodiment, if the OMWL address is defined as an application specific parameter, it is dynamically updated by the applications running at the system layer. In yet another embodiment, if the OMWL address is defined as the expected number of wireless hops to a set of landmarks, the landmarks can periodically flood the network with an advertisement packet containing the location coordinates of the landmark. The nodes in the network can therefore count the expected numbers of hops to the landmarks.

The interface between the SL 245 and the OMWL 250 is also illustrated in the opportunistic mesh network architecture 290 for Node D 240 in FIG. 2A. Specifically, a Module Request signal 255 is sent from the OMWL 250 to the SL 245, indicating the pending incoming transmissions. On receipt of the Module Request signal 255, the SL 245 decides whether the OMWL 250 should be receive the pending transmission, by replying a signal on Module Set 260. Module Set signaling 260 can also be used to indicate the module type of the current data. The SL 245 can also turn off the OMWL 250, by using the Module Set signaling 260, so as to put the wireless device of Node D 240 in a power saving sleep mode or idle mode.

Parameters Set signaling 265 is employed in setting up the module performance parameters, determining for example the transmitter output power and data rate of the corresponding wireless link module. In particular, for a broadcast module forming part of the OMWL, the parameters can be of the broadcast range, DPC limit, latency, transmitter output power, and transmitter data rate, in the embodiments of the current invention. In an embodiment of the broadcast module, the DPC limit can be the same as the broadcast range. In another embodiment, the transmitter output power and data rate are explicitly given; in another embodiment, the transmitter output power and data rate may be determined in dependence of a combination of factors including, but not limited to QoS requirements of broadcast range, DPC, and latency.

For a unicast module forming part of the OMWL, an exemplary Parameter Set signaling 265 would be parameters such as destination OMWL address, end-to-end latency requirement, transmitter output power, and transmitter data rate. In another embodiment, the transmitter output power and data rate are explicitly given, yet in another embodiment, the transmitter output power and data rate are the optimization results decided by the destination OMWL address and the QoS requirement of the end-to-end latency.

In an embodiment of the current invention these aforementioned inter-layer signals are utilized in the way specified by the service primitives, provided in the OMWL Service Access Point (OMWL-SAP) 280. An exemplary set of service primitives are shown in Table 1 below, and will be utilized for illustrating the state transferring diagram of OMWL in FIG. 3.

TABLE 1

OMWL primitives

| OMLE Primitive | Description |
| --- | --- |
| OMWL-DATA. Request | The primitive is sent from SL 245 to OMWL 250, requesting the transmission of an OMWL 250 payload in a DATA packet. The primitive also specifies the used module type and the module parameters. |
| OMWL-DATA. Indication | The primitive is sent from OMWL 250 to SL 245, indicating the receipt of of an OMWL 250 payload. The primitive also carries the information about the used module type and the module parameters, in addition to the payload data. |
| OMWL-DATA-STATUS. Indication | The primitive is sent from OMWL 250 to SL 245, indicating the status of the previous OMWL-DATA. Request. The returned status can be one of the three: Success, Failed, and Busy. "Success" indicates that the associated payload has been transmitted successfully. "Failed" indicates that the associated payload failed to be transmitted. "Busy" indicates that the associated payload is not transmitted, because the current status of OMWL 250 is not ready, i.e., not in IDLE state (defined in FIG. 3) |
| OMWL-RECEIVE. Request | The primitive is sent from OMWL 250 to SL 245 for requesting to set up a receive module. |
| OMWL-RECEIVE. Confirm | The primitive is sent from SL 245 to OMWL 250 confirming the OMWL-RECEIVE. Request, with the returned status as either Success or Failed. "Success" indicates that the request is permitted, and "Failed" indicates that the request is rejected. |
| OMWL-START. Request | The primitive is sent from SL 245 to OMWL 250, which turns on the OMWL 250. |
| OMWL-STOP. Request | The primitive is sent from SL 245 to OMWL 250, which turns off the OMWL 250. |

Alternatively in another embodiment the Module Set signaling 260 can be used to determine which of a plurality of sleep/idle modes the wireless device of Node D 240 established in. The Application Data bus 270 is used for transferring the OMWL payload (not shown for clarity) between the SL 245 and the OMWL 250.

Referring to FIG. 2B embodiments of two modules for the opportunistic mesh wireless layer, namely a broadcast module 201 and a unicast module 202. In an embodiment of the current invention as outlined in the detailed descriptions the unicast module 202 utilizes four different types of packets, which are DATA 203, RTS (Ready to Send) 204, CTS (Clear to Send) 205, and ACK 206 (Acknowledge), respectively. In the broadcast module 201, only DATA 207 and RTS 208 are utilized. The DATA packet contains the OMWL payload, while RTS, CTS, and ACK are control packets. In both broadcast module 201 and unicast module 202, RTS 204 and 208 respectively contain the source OMWL address and the module type, i.e. broadcast 201 or unicast 202. In addition, in the unicast module 202, RTS 204 also contains the destination OMWL address and the QoS (Quality of Service) parameters, such as transmitter data rate and output power. In an embodiment of the current invention, where a single wideband data radio is utilized, RTS 204 or 208 may also include other control information, as described later in FIG. 6 and FIG. 7). CTS 205 is the acknowledgement of the RTS packet being 204 or 208 depending upon broadcast module 201 or unicast module 202 respectively. ACK 206 is the acknowledgement of the DATA packet 203, in the unicast module 202. The uses of the packets in completing the module transmissions are decided by the module coordination functions, which will be described later in FIG. 4, FIG. 5, FIG. 6, and FIG. 7.

The broadcast module 201 is used when the management or data information is sent to all the neighbors of the source node. The neighbors of the source node are defined as the nodes within a certain DPC to the source node. There is no guaranteed delivery of the DATA packet. The associated DPC can be locally calculated at the node in receipt of the DATA packet, using the methods and definitions specified previously. In another embodiment, the broadcast module 201 can also be used when the source node does not know the OMWL address of the destination node; however, it knows that the destination node is within a certain DPC to the source node. In order to achieve guaranteed DATA packet delivery the destination node, on receipt of the broadcasted DATA packet, replies the source node an acknowledgement by using the unicast module 202. At the source node the SL can choose to re-broadcast the DATA packet if the corresponding acknowledgement is not received.

The unicast module 202 is used for sending the management or data information from a source node to a destination node. The source node needs to know the OMWL address of the destination node, in order to use the unicast module 202. As specified later in the unicast module coordination function (UMCF) design of FIGS. 5 and 7, the unicast module 202 is able to opportunistically choose at least a portion of the best path, i.e., the set of relay nodes, from the source to the destination. There can also be guaranteed DATA packet delivery, with the using of the unicast module 202, in some embodiments of the current invention.

Figure 3:
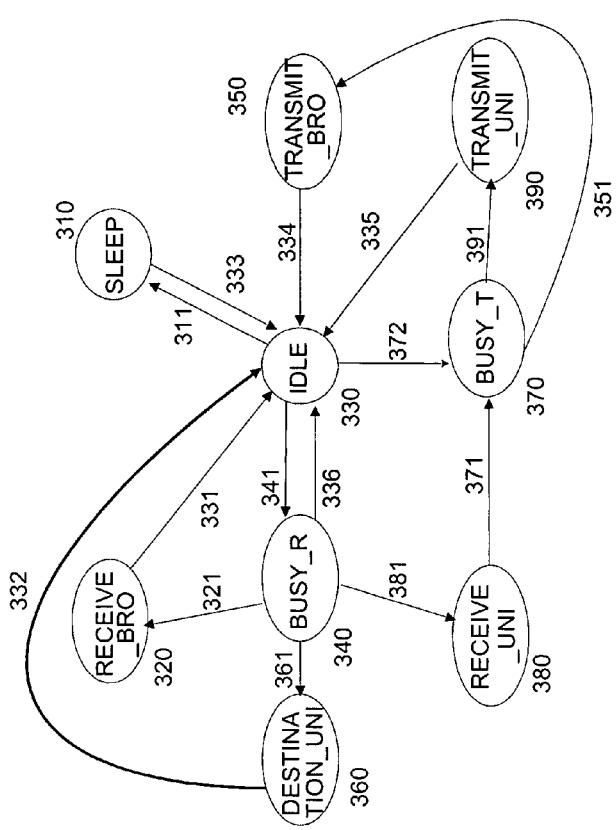
FIG. 3 shows the OMWL state diagram, conforming to the preferred embodiment of the current invention.

FIG. 3 shows an embodiment of the OMWL state-transferring diagram. Nine distinctive states are shown in FIG. 3, as states 310-390. The definitions of the states are listed in Table 2 below.

TABLE 2

State descriptions of the OMWL state diagram

| ID | State | Definition |
|---|---|---|
| 310 | SLEEP | In SLEEP state, OMWL neither transmits nor receives on the radio. |
| 320 | RECEIVE_BRO | In RECEIVE_BRO state, OMWL receives a broadcast DATA packet, by using the broadcast module. |
| 330 | IDLE | In IDLE state, the OMWL neither transmits nor receives on the radio. It listens on the radio, deciding if there are new incoming transmissions. |
| 340 | BUSY_R | In BUSY_R state, OMWL receives on the radio, and decides whether the incoming transmission is a transmission of the broadcast module or the unicast module. |
| 350 | TRANSMIT_BRO | In TRANSMIT_BRO state, OMWL transmits a broadcast DATA packet, by using the broadcast module. |
| 360 | DESTINATION_UNI | In DESTINATION_UNI state, OMWL receives a unicast DATA packet, by using the unicast module. And the local node is the destination of the DATA packet. |
| 370 | BUSY_T | In BUSY_T state, OMWL neither transmits nor receives on the radio. It listens for identifying an appropriate transmission channel. The period of BUSY_T depends on the adopted module, and is defined in the module coordination functions. |
| 380 | RECEIVE_UNI | In RECEIVE_UNI state, OMWL receives a unicast DATA packet, by using the unicast module. And the local node is a relay node. |
| 390 | TRANSMIT_UNI | In TRANSMIT_UNI state, OMWL transmits a unicast DATA packet, by using the unicast module. |

Within the embodiment of FIG. 3 the OMWL may move from one state to another state, the according transfer from one state to another being denoted by the branches 311, 321, 331-336, 341, 351, 361, 371-372, 381 and 391. The descriptions for each of the transferring branches being listed in Table 3.

By using the two distinctive tones, for an arbitrary channel n, four distinctive channel states can be determined at a local node, which are C_IDLE, C_TRANSMIT, C_RECEIVE, and C_TR. The definitions of the aforementioned four channel states are listed in Table 4, which are used in the illustrations of module coordination functions in FIGS. 4 and 5.

TABLE 3

Transferring branches of the OMWL state diagram

| ID | Conditions on Taking the Transferring Branch |
|---|---|
| 311 | The SL invokes the primitive OMWL-STOP. Request. |
| 321 | OMWL decides that the pending DATA packet is of the broadcast module. This is achieved by deciding the module type in the RTS packet. |
| 331 | The receipt of of the broadcast DATA packet ends. If the receipt is successful, the primitive OMWL-DATA. Indication is invoked. |
| 332 | The unicast DATA packet has been successfully received at the local node, and an ACK has been sent to the initiating node, conforming to the UMCF. The OMWL invokes the primitive OMWL-DATA. Indication. |
| 333 | The SL invokes the primitive OMWL-START. Request. |
| 334 | The broadcast transmission has finished, and the primitive function OMWL-DATA-STATUS. Indication is invoked, with the returned status as "Success". |
| 335 | The ACK has been received, corresponding to the current unicast transmission. If the transmission is requested by the SL, the primitive function OMWL-DATA-STATUS. Indication is invoked, with the returned status as "Success". |
| 336 | No RTS is received; or the unicast module transmission is detected, but the local node is not elected as a relay node, conforming to the UMCF. |
| 341 | On sensing that there is new incoming transmission, the OMWL invokes the primitive OMWL-RECEIVE. Request. The SL replies the primitive OWML-RECEIVE. Confirm, with the returned status as "Success". |
| 351 | OMWL identifies an appropriate channel, and starts the RTS transmission, conforming to the BMCF. |
| 361 | OMWL decides that the incoming DATA packet is of the unicast module. This is achieved by deciding the module type in the RTS. Furthermore, the local node is the destination of the DATA packet. |
| 371 | The unicast DATA packet has been successfully received at the local node, and an ACK has been sent to the node initiating the unicast, conforming to the UMCF. |
| 372 | The SL invokes the primitive function OWML-DATA. Request. |
| 381 | OMWL decides that the pending DATA packet is of the unicast module. This is achieved by deciding the module type in the RTS packet. Furthermore, the local node is elected as the relay node, conforming to the UMCF. |
| 391 | OMWL identifies a suitable channel, and starts the RTS transmission, conforming to the UMCF. |

Figure 4:
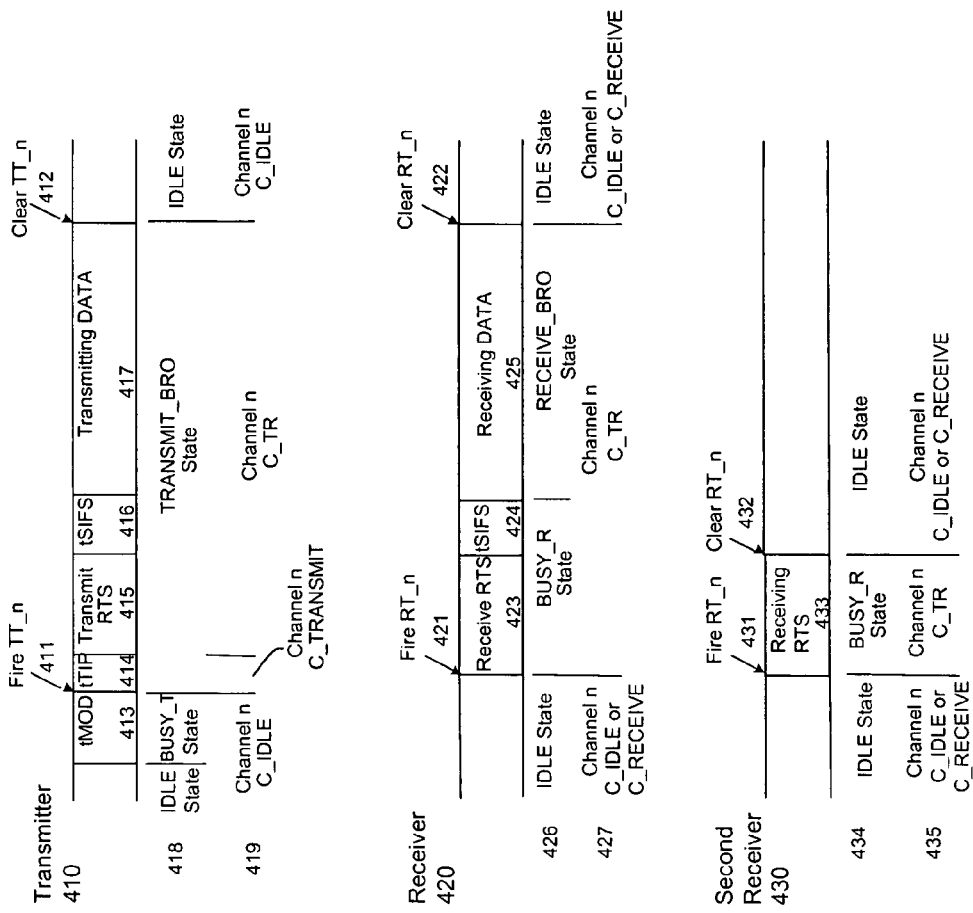
FIG. 4 shows an embodiment of the broadcast module coordination function (BMCF) design, with a data radio of multiple narrow band channels, and a separate busy tone radio, according to the current invention.
Figure 5:
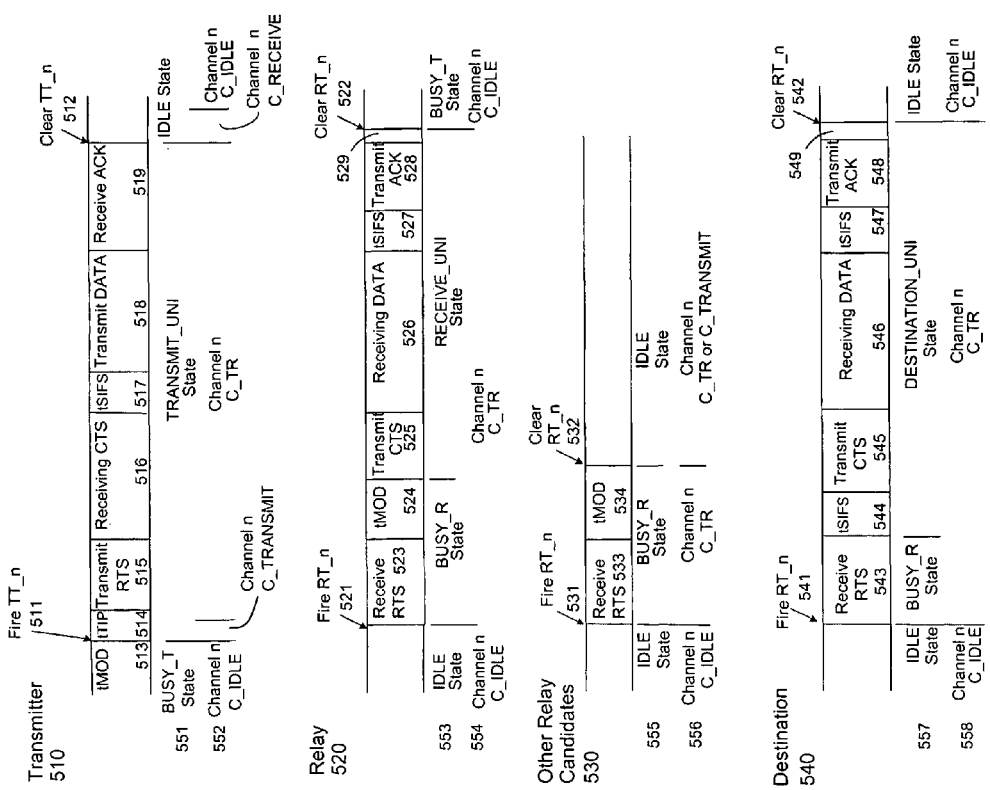
FIG. 5 shows an embodiment of the unicast module coordination function (UMCF) design, with a data radio of multiple narrow band channels, and a separate busy tone radio, according to the current invention.

Referring to FIG. 4 and FIG. 5 shown are embodiments of the broadcast module coordination function (BMCF), and unicast module coordination function (UMCF) respectively, both embodiments being for a design based upon a data radio of multiple narrow band channels, and a separate busy tone radio. In the embodiments, the data radio can be using a standard technology, such as the physical layer of IEEE 802.11a providing 12 channels centered within the 5 GHz band [IEEE Standard 802.11a, "Wireless LAN Medium Access Control (MAC) and Physical Layer (PHY) Specifications: Higher-Speed Physical Layer in the 5 GHz Band," 1999.7], IEEE 802.15.4 which provides for 16 channels in the 2.4 GHz band [IEEE Standard 802.15.4, "Wireless Medium Access Control (MAC) and Physical Layer (PHY) Specifications for Low-Rate Wireless Personal Area Networks (LR-WPANs)," 2003], as well as non-standard technologies. The busy tone radio is able to transmit and detect a set of distinctive frequency tones. For an arbitrary channel n, two distinctive tones are associated to the channel, which are the transmitter tone TT_n, and the receiver tone RT_n.

The transmitter tone TT_n is used by the transmitter to indicate the receivers of the pending transmission, and avoid co-channel interference on control packets. The receiver tone RT_n is used by the receiver to avoid co-channel interference.

TABLE 4

Definitions of the channel states, with one multi-channel data radio and one busy tone radio

| State of Channel n | Description |
|---|---|
| C_IDLE | The channel n is idle, i.e. neither TT_n nor RT_n tone is detected or fired. |
| C_TRANSMIT | TT_n tone is detected or fired, i.e. the channel n is utilized to transmit data in the neighborhood of the local node. |
| C_RECEIVE | RT_n tone is detected or fired, i.e. the channel n is utilized to receive data in the neighborhood of the local node. |
| C_TR | Both TT_n and RT_n are detected or fired, i.e. the channel n is utilized to both transmit and receive data in the neighborhood of the local node. |

Now referring to Table 5 shown are the radio status states, i.e. "transmit", "receive", "listen", or "sleep", for the different OMWL states. Specifically, "transmit" suggests that the radio is transmitting data packets; "receive" suggests that the radio is in receipt of data packets; "listen" suggests that the radio is monitoring the media, which can be either duty cycled (lower power listen), or full duty (smaller sensing delay); and "sleep" suggests that the radio is turned off. In particular, the busy tone radio can only be in one of the three states, i.e. "transmit", "listen", and "sleep", since the busy tone radio does not have data receive functionalities.

TABLE 5

Radio status at different OMWL states, with one multi-channel data radio and one busy tone radio

| OMWL State | Data Radio Status | Busy Tone Radio Status |
|---|---|---|
| SLEEP | sleep | sleep |
| RECEIVE_BRO | receive | transmit |
| IDLE | sleep | listen |
| BUSY_R | receive/listen | transmit |
| TRANSMIT_BRO | transmit | transmit |
| DESTINATION_UNI | receive/transmit | transmit |
| BUSY_T | sleep | listen |
| RECEIVE_UNI | receive/transmit | transmit |
| TRANSMIT_UNI | transmit/receive | transmit |

For illustrating the module coordination functions, Table 6 also defines a set of time parameters to be used in FIGS. 4 and 5.

TABLE 6

Timing parameters definitions, with one multi-channel data radio and one busy tone radio

| Name | Description | Unit |
|---|---|---|
| tSIFS | Timing delay of a single inter-packet space | tRXRF + tPROC |
| tTIP | Timing delay of a transmission indication period | tON + tBTS |
| tUST | Timing delay of a unit slot time | 2 * tAP + tCCA |
| tRXTX | Timing delay of RX/TX turn around | Implementation dependent (<1 us) |
| tPROC | Timing delay of module processing | Implementation dependent (<1 us) |
| tBTS | Timing delay of busy tone radio sensing | Implementation dependent |
| tON | Time delay of turning on the data radio (from sleep) | Implementation dependent |
| tAP | Timing delay of an air propagation | Range dependent (<1 us) |
| tCCA | Timing delay of carrier sensing | Data radio dependent (<4 us) |
| tMOD | Timing delay parameter of the specific module | Module and node dependent |

Note:
The metrics shown in parentheses are typical values for state-of-the-art IEEE 802.11a physical radios.

Shown in FIG. 4, the embodiment of the broadcast module coordination function (BMCF) design, with a data radio of multiple narrow band channels, and a separate busy tone radio, is outlined. The transmitter 410 uses the broadcast module to broadcast a DATA packet. A first transmitter status line 418 shows the transmitter OMWL states at different time periods, while the second transmitter line status line 419 shows the channel states at different time periods, of one utilized channel n. The time period that the transmitter spends in the BUSY_T state is denoted by tMOD 413, and is introduced to reduce RTS collisions due to the medium propagation and sensing delay. As such tMOD 413 can be a random value larger than the tBTS. Specifically, the transmitter 410 proceeds to the instance "Fire TT_n" 411 with the channel n, if and only if the channel n state is C_IDLE in the period of tMOD 413. "Fire TT_n" 411 is the instance that the transmitter fires the TT_n tone and transfers to TRANSMIT_BRO state. tTIP 414 is a time period between the firing of TT_n and the transmission of the RTS packet, which is used for indicating the pending transmission to the receivers. 415 is the RTS transmit time. The inter-packet interval between the RTS and the DATA packets is denoted by tSIFS 416, and 417 is the time period of transmission for the DATA packet. "Clear TT_n" 412 is the instance that the transmitter finishes the broadcast module and clears the TT_n tone.

The receiver 420 receives the broadcasted DATA packet from the transmitter 410, by using the broadcast module. The first receiver status line 426 shows the receiver OMWL states at different time periods, while the second receiver status line 427 shows the channel states at different time periods, of one utilized channel n. The receiver keeps listen to the transmitter busy tones, which indicates the new incoming transmissions. "Fire RT_n" 421 is the instance that the receiver transfers to BUSY_R state, and the RT_n tone is fired, for the protection of the receipt of from interference. The time periods of receive RTS and the inter-packet interval are denoted by Receive RTS 423 and tSIFS 424, respectively. Since the Receive RTS 423 from transmitter 410 indicates that the current transmission is from a broadcast module, the receiver 420 transfers to the RECEIVE_BRO state. Herein, Receiving DATA 425 is the time period of receipt of the DATA packet, after which the RT_n tone is cleared at the instance "Clear RT_n" 422.

A second receiver 430 also senses the incoming transmission from transmitter 410. Accordingly "Fire RT_n" 431 is the instance that the receiver transfers to BUSY_R state, and the RT_n tone is fired. Here the second receiver first status line 434 shows the receiver OMWL states at different time periods, while the second receiver second status line 435 shows the channel states at different time periods, of one utilized channel n. However, after the period Receiving RTS 433, it is decided that the RTS has not been correctly received, i.e. due to the channel corruption. The second receiver 430, therefore, clears the RT_n tone at the instance "Clear RT_n" 432, and transfers to IDLE state.

Shown in FIG. 5, the embodiment of the unicast module coordination function (UMCF) design, with a data radio of multiple narrow band channels, and a separate busy tone radio, is outlined. In FIG. 5 four types of nodes are used for notation, which are the transmitter 510, the destination node 540, the relay node 520, and relay candidate nodes 530. The destination node 540 is the destination of the unicast module within transmitter 510. A relay node 520 is one of the set of nodes on the path of multihop transmission from the source to the destination. A transmitter node 510 can be either the source node or one relay node. A relay candidate node 530 is of the set of nodes participating in the relay nodes selection, in the unicast module.

The transmitter 510 uses the unicast module sending a DATA packet to the destination. The first transmitter status line 551 shows the OMWL states at different time periods, while the second transmitter status line 552 shows the channel states at different time periods, of one utilized channel n. The time period tMOD 513 denotes the time spent in the state BUSY_T. tMOD 513 is introduced to reduce RTS collisions due to the medium propagation and sensing delay, which can be a random value larger than the tBTS. Specifically, the transmitter 510 proceeds to the instance "Fire TT_n" 511 with the channel n, if and only if the channel n state is C_IDLE in the period of tMOD 513. "Fire TT_n" 511 is therefore the instance of firing the TT_n tone and transferring to TRANSMIT_UNI state. Time period of tTIP 514 denotes the time between the firing of TT_n and the transmission of the RTS packet, Transmit RTS 515, which is used for indicating the pending transmission to the receivers. The remaining time within the TRANSMIT_UNI state therefore is denoted by the time periods of Receiving CTS 516, inter-packet interval tSIFS 517, transmit the DATA packet denoted by Transmit DATA 518, and receipt of the ACK signal, indicated by Receive ACK 519. Upon exiting the TRANSMIT_UNI state, "Clear TT_n" 512 denotes the time instance that transmitter 510 finishes transmission of from the unicast module, clears the TT_n tone, and enters the IDLE state.

The relay node 520 is a receiver using the unicast module to receive a DATA packet from the source or the previous relay node 510. The first relay status line 553 shows the OMWL states at different time periods, while the second relay status line 554 shows the channel states at different time periods, of one utilized channel n, at the receiver 520. The instances that relay node 520 transfers to BUSY_R state and the RT_n tone are fired are denoted by "Fire RT_n" 521, thereby protecting the receive process from interference. Between the RT_n tone being fired and cleared with the instance "Clear RT_n" 522, the time periods of relay node 520 are denoted by the steps of Receive RTS 523, opportunistically determining the relay node 520 during delay tMOD 524, Transmit CTS 525, Receiving DATA 526, inter-packet interval tSIFS 527, and Transmit ACK 528, respectively. A small period of waiting time 529, in order to guarantee that the ACK is received at the transmitter 510 is also included. Upon the instance "Clear RT_n" 522, the relay node 520 clears the RT_n tone, and transfers to BUSY_T state.

In an embodiment of the current invention, the calculation of tMOD 524 can be obtained in the following equation (1):

$$tMOD = \left(\Pi - \left\lfloor \frac{D_{t,d} - D_{r,d}}{\Omega} \cdot \Pi \right\rfloor\right) \cdot tUST + tSIFS \quad (1)$$

Within equation (1):

Π is a constant deciding the maximum tMOD time period;
Ω denotes the maximum DPC within a single hop transmission, decided by the maximum radio range;
$D_{t,d}$ is the DPC between the transmitter 510 and the destination; and
$D_{r,d}$ is the DPC between the local node and the destination.

As such, among the relay candidates of the transmitter 510, relay node 520 is the best one, i.e. the node presenting the lowest DPC to the destination for this particular packet, and has the smallest delay. Since the destination node 540 is not direct communication with the transmitter 510, the relay node 520 transmits CTS, after tMOD 524, claiming status as a relay node. Under the condition that more than one node with the same smallest tMOD exist (rare case in real world), the transmitter can resolve one of them either in the period of Receiving CTS 516 or Receive ACK 519, which is not directly shown in the drawing for conciseness, but would be evident and straightforward for one skilled in the art. Within other embodiments of the invention it can be beneficial to establish that $D_{r,d}$ should be less than $D_{t,d}$, so that the DPC to the destination is always decreasing along the unicasting path.

The other relay candidate nodes 530 also comprise receivers providing a relay option, for participating in the relay selection of the transmitter 510. The first relay candidate status line 555 shows the OMWL states at different time periods, while the second relay candidate status line 556 shows the channel states at different time periods, of one utilized channel n, at the receiver of relay candidate 530. The instance that the receiver transfers to BUSY_R state, and the RT_n tone is fired, for the protection of the receive from interference, is denoted by "Fire RT_n" 531. After receipt of the RTS in Receive RTS 533, relay candidate node 530 calculates the local time parameter tMOD 534, similar to the relay 520. Since the relay 520 is a better relay candidate than other relay candidate 530, i.e. it offers lower DPC, represented in this embodiment by a smaller tMOD, other relay candidate 530 detects the CTS transmission of relay 520, by carrier sensing, and therefore quits the opportunistic wireless link process with the transmitter 510. The instance that this occurs is denoted by "Clear RT_n" 542, where the other relay candidate 530 clears the tone RT_n and transfers to IDLE state. The period of time that the other relay candidate 530 is with BUSY_R state denoted by two time blocks, Receive RTS 533 and tMOD 534, respectively.

The destination 540 is the destination of the unicast DATA packet, which appears in the last hop of the unicast transmissions. The first destination status line 557 shows the OMWL states at different time periods, while the second destination status line 558 shows the channel states at different time periods, of the one utilized channel n. The only difference between destination 540 and relay 520, appears in the period denoted by tSIFS 544 and tMOD 524 respectively for these wireless nodes, which is the time period between receipt of the RTS and transmission of CTS. For the destination 540, tSIFS 544 is always smaller than corresponding tMOD 524 of the relay 520. Therefore, if the destination node 540 is within the direct transmission of the transmitter 510, it will always transmit the Transmit CTS 545, after tSIFS 544, thereby claiming status as the destination node, and continues receipt of the DATA packet. "Fire RT_n" 541 corresponds to the instance that the destination 540 transfers to BUSY_R state, and the RT_n tone is fired, for the protection of the receipt from interference. The period of time during which the destination 540 is within the BUSY_R and DESTINATION_UNI states is broken down into the sequence comprising Receive RTS 543, tSIFS 544, Transmit CTS 545, Receiving DATA 546, tSIFS 547 and Transmit ACK 548. A small period of waiting time 549 is included also in order to guarantee that the ACK is received at the transmitter 510. "Clear RT_n" 542 then denoting the instance that destination 540 clears the RT_n tone, and transfers to BUSY_T state.

Figure 6:
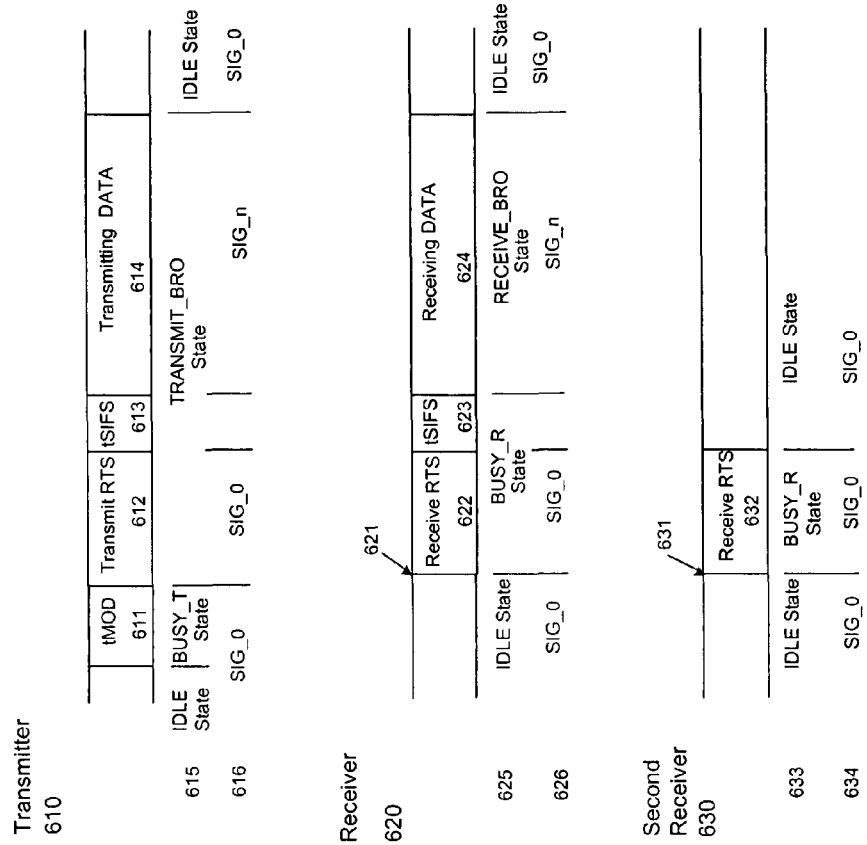
FIG. 6 shows another embodiment of the broadcast module coordination function, with a data radio of wideband channel, according to the current invention.
Figure 7:
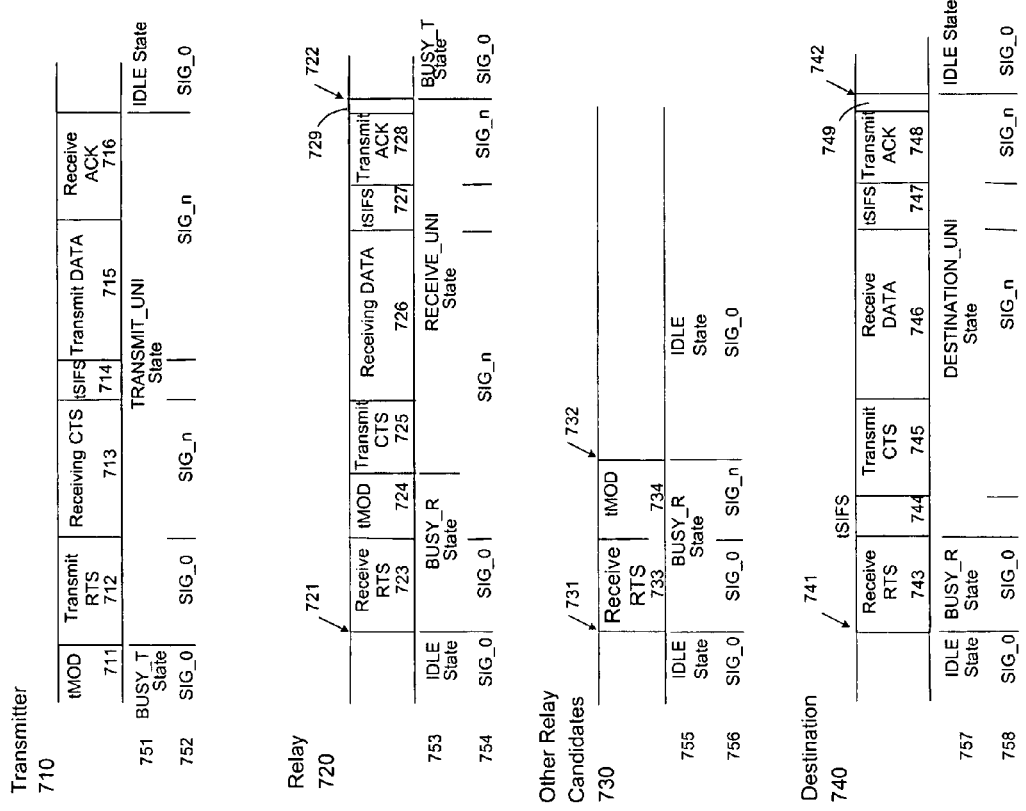
FIG. 7 shows another embodiment of the unicast module coordination function, with a data radio of wideband channel, according to the current invention.

FIG. 6 and FIG. 7 show second embodiments of the broadcast module coordination function (BMCF) and the unicast module coordination function (UMCF), respectively, wherein a wideband data radio is utilized. In the embodiments, a wideband data radio can accommodate multiple co-located wireless transmissions, where distinctive signal signatures differentiate different transmissions. In one such embodiment, such signatures may be orthogonal code spreading sequences, similar to CDMA (code division multiple access) technique. In another embodiment, such signatures are non-overlapping frequency hopping sequences. In yet another embodiment, such signatures are the time hopping sequences, similar to the technique of time hopping Ultra Wideband transmissions. Depending on the embodiment techniques, co-located transmissions of identical aforementioned signal signatures, can also be differentiated, by considering that the starting time of the transmissions are non-overlapping, i.e. exploiting the autocorrelation whiteness of the signatures. In the description, we do not specify the particular wideband channel embodiments, bearing in mind that such wideband communication techniques have been developed.

Table 7 shows the wideband radio status, i.e., "transmit", "receive", "listen", or "sleep", at different OMWL states, as used within FIGS. 6 and 7. The definitions of different statuses are the same as those in Table 5.

TABLE 7

Radio status at different OMWL states, with one wideband data radio

| OMWL State | Data Radio Status |
|---|---|
| SLEEP | sleep |
| RECEIVE_BRO | receive |
| IDLE | listen |
| BUSY_R | receive/listen |
| TRANSMIT_BRO | transmit |
| DESTINATION_UNI | receive/transmit |
| BUSY_T | listen |
| RECEIVE_UNI | receive/transmit |
| TRANSMIT_UNI | transmit/receive |

For illustrating the module coordination functions, Table 8 also defines a set of time parameters to be used in FIGS. 6 and 7, which are in general similar to those outlined in Table 6, except for introducing the parameter tPTS.

TABLE 8

Timing parameters definitions, with one wideband data radio

| Name | Description | Unit |
|---|---|---|
| tSIFS | Timing delay of a single inter-packet space | tRXRF + tPROC |
| tPTS | Timing delay of sensing the transmission indication tone | Implementation dependent |
| tUST | Timing delay of a unit slot time | 2 * tAP + tCCA |
| tRXTX | Timing delay of RX/TX turn around | Implementation dependent (<1 us) |
| tPROC | Timing delay of module processing | Implementation dependent |
| tAP | Timing delay of an air propagation | Range dependent |
| tCCA | Timing delay of carrier sensing | Data radio dependent |
| tMOD | Timing delay parameter of the specific module | Module and node dependent |

Referring to FIGS. 6 and 7, there is a common signature defined as SIG_0 for transmission of RTS packets. Besides the components described previously in FIG. 2, RTS also now contains a randomly generated signature SIG_n, which is thereon utilized for transmission of the DATA packet, and CTS/ACK packets (in the unicast module). In an exemplary embodiment, where low power duty cycled listen is implemented, RTS also includes a period of preamble tone, i.e., the transmission indication tone, used for indicating the pending RTS transmissions to the receivers. The length of the transmission indication tone is decided by the sensing delay tPTS.

Shown in FIG. 6, an embodiment of the broadcast module coordination function (BMCF) is described, wherein a transmitter 610 uses the broadcast module to broadcast a DATA packet. The first transmitter status line 615 shows the OMWL states at different time periods, while the second transmitter status line 616 shows the signal signature used at different time periods. The time period tMOD 611 denotes the time that the transmitter spends in BUSY_T state. tMOD 611 is introduced for the random starting time of different RTS transmissions, which can be a random value of the order of tPTS, which represents the timing delay of sensing the transmission indication tone. The RTS transmit time is denoted by Transmit RTS 612, the inter-packet interval by tSIFS 613; and Transmitting DATA 614 denotes the time period of transmission of the DATA packet.

The receiver 620 receives the broadcasted DATA packet from the transmitter 610, by using the broadcast module. The first receiver first status line 625 shows the OMWL states at different time periods, while the first receiver second status line 626 shows the signal signature used at different time periods. The receiver 620 keeps listening to the transmission indication tone, whereupon the receiver transfers to BUSY_R state, event 621, upon the transmission indication tone being detected. The period that the receiver 620 is within the BUSY_R state, comprises the time periods of Receive RTS 622 and the inter-packet interval, tSIFS 623, respectively. Since the received RTS from transmitter 610 indicates that the current transmission is one from a broadcast module, the receiver 620 transfers to the RECEIVE_BRO state, receives DATA during Receiving DATA 624 and thereupon returns to the IDLE state.

Within the opportunistic wireless network a second receiver 630 also senses the incoming transmission from the transmitter 610. The second receiver first status line 633 shows the OMWL states at different time periods, while the second receiver second status line 634 shows the signal signature used at different time periods. Even 631 denotes the instance that the receiver transfers to BUSY_R state, e.g. the transmission indication tone is detected. However, after the period Receive RTS 632, it is decided that the RTS has not been correctly received, i.e. due to the channel corruption. The second receiver 630, therefore, transfers to IDLE state.

Shown in FIG. 7, an embodiment of the unicast module coordination function (UMCF) design is described. In a manner similar to FIG. 5, four types of nodes are used for the description, which are the transmitter 710, the destination node 740, the relay node 720, and other relay candidate nodes 730.

The transmitter 710 uses the unicast module to send a DATA packet to the destination. The first transmitter status line 751 shows the OMWL states at different time periods, while the second transmitter status line 752 shows the signal signatures used at different time periods. Time period tMOD 711 denotes the time spent in BUSY_T state for the transmitter 710. The time period tMOD 711 being introduced for the random starting time of different RTS transmissions, which can be a random value at the order of tPTS. The time period for which the transmitter 710 is within the TRANSMIT_UNI state, comprises Transmit RTS 712, Receiving CTS 713, interpacket interval tSIFS 714, Transmit DATA715, and Receive ACK 716.

The receiver 720 is a relay node, using the unicast module to receive a DATA packet from the transmitter 710. The first receiver status line 753 shows the OMWL states at different time periods, while the second receiver status line 754 shows the signal signatures used at different time periods. The instance that the receiver transfers to BUSY_R state, e.g., the transmission indication tone is detected, is denoted by event 721. The receiver 720 then transfers to RECEIVE_UNI state. These two states comprise time periods: Receive RTS 723, tMOD 724, Transmit CTS 725, Receiving DATA 726, tSIFS 727, and Transmit ACK 728. Finally delay 729 represents a small period of waiting time, in order to guarantee that the ACK is received at the transmitter 710. Event 722 denotes the instance that receiver 720 has finished the receipt of the DATA packet, and transfers to the BUSY_T state. Time period tMOD 724 is used for opportunistically selecting the relay node, which is the similar to tMOD 524 in FIG. 5.

The other relay candidates 730, by virtue of being within communication range of the transmitter 710, may potentially participate in the relay selection of the transmitter 710. Other relay candidate first status line 755 shows the OMWL states at different time periods, while other relay candidate second status line 756 shows the signal signatures used at different time periods. Event 731 is the instance that the receiver transfers to BUSY_R state, e.g. the transmission indication tone is detected. After receipt of the RTS in Receive RTS 733, other relay candidate 730 also calculates the local time parameter tMOD 734, similar to the node relay 720. Since relay 720 is a better relay candidate than other relay candidate 730, i.e. with lower DPC to the destination (smaller tMOD), other relay candidate 730 detects the CTS transmission of relay 720, by signature sensing, and therefore quits the opportunistic wireless link process. Event 732 represents the instance that other relay candidate 730 transfers to IDLE state and quits.

The destination 740 is the destination of the unicast DATA packet, which appears in the last hop of the unicast transmissions. The first destination status line 757 shows the OMWL states at different time periods, while the second destination status line 758 shows the signal signatures used at different time periods. The only difference between destination 740 and relay 720 appears in times tSIFS 744 and tMOD 724 of these nodes which are the time periods between receipt of the RTS and transmission of CTS for the two nodes respectively. Since 744 is of the length tSIFS, it is always smaller than 724. Therefore, if the destination 740 is within the direct transmission of the transmitter 710, it will always transmit the CTS, after tSIFS 744, claiming the status as the destination node, and continues receipt of the DATA packet. Event 741 denoting the instance that the receiver transfers to BUSY_R state, i.e., the transmission indication tone is detected. The period of time the destination 740 spends within the BUSY_R state is denoted by Receive RTS 743. After this period of time, the destination 740 transfers to the DESTINATION_UNI state which comprises tSIFS 744, Transmit CTS 745, Receive DATA 746, tSIFS 747, and Transmit ACK 748. Delay 749 represents a small period of waiting time added in order to guarantee that the ACK is received at the transmitter 710. Event 742 is the instance that the destination 740 has finished receiving, and transfers to IDLE state from DESTINATION_UNI state.

Figure 8:
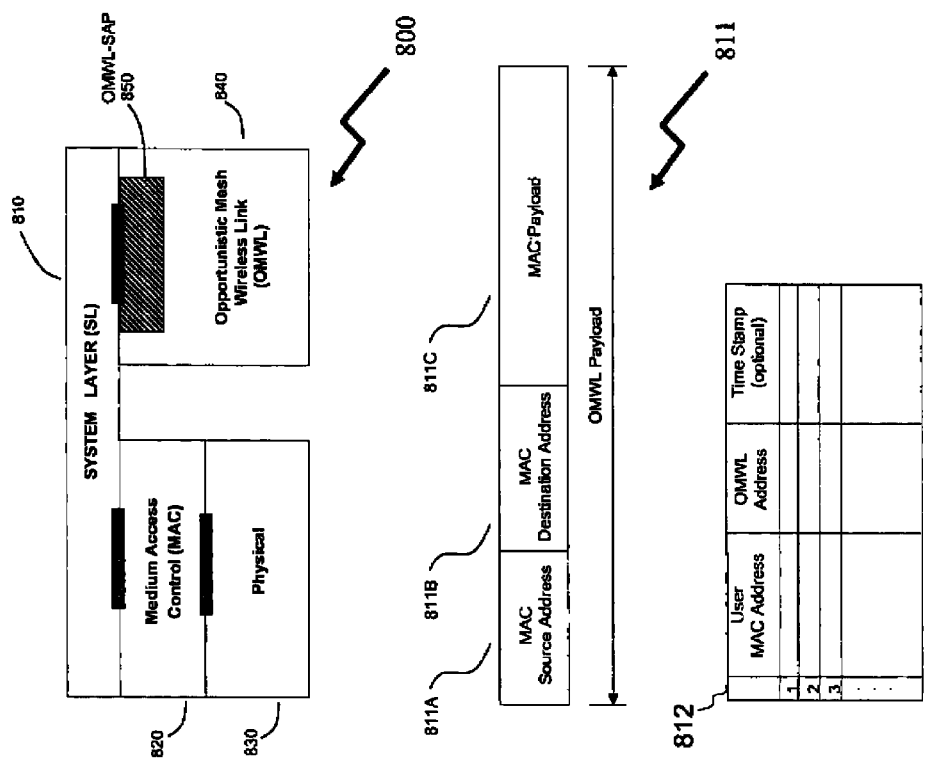
FIG. 8 shows an embodiment of a network border gateway (BGL), with an OSI based LAN switch, according to the current invention.

Referring to FIG. 8 shown is an embodiment of a network border gateway 800 (BGL) as viewed from the perspective of layers similar to that employed supra in respect of FIG. 2A. The network border gateway is implemented with an OSI based LAN switch, according to this embodiment. The System Layer (SL) 810 of the BGL 800, interfaces both the LAN switch and the OMWL 840. The BGL 800 further comprises MAC layer 820 and Physical layer 830. The embodiments of MAC layer 820 and Physical layer 830, can be virtually any OSI based LAN technology including for example IEEE 802.11, IEEE 802.16, Ethernet, and Token Ring. OMWL 840 and OMWL-SAP 850 are as described previously for elements OMWL 250 and OMWL-SAP 280 of the opportunistic mesh network architecture 290 for Node D 240 in FIG. 2A.

Within this embodiment, the SL 810 of the BGL 800 implements protocol translations as the followings. Shown in OMWL Payload 811, the MAC layer packet going out from the LAN, is packed as an OMWL payload, and sent by the unicast module of OMWL 840. The MAC layer packet comprises MAC Source Address 811A, MAC Destination Address 811B, and MAC Payload 811C. The MAC Destination Address 811B is extracted from the MAC header, in order to determine destination address of OMWL unicast module. First, the SL 810 of the BGL 800 searches a local table 812. If the MAC Destination Address 811B appears in the local table 812, the destination OMWL address is found in the same entry. If the MAC Destination Address 811B is not found, the OMWL payload 810 is either dropped or sent to one of the known network border gateway with a network router (BGR), as described below in respect of FIG. 9. On receipt of an OMWL payload 810 from the OMWL 840, which is determined as a MAC payload, the SL 810 of BGL 800 forwards the MAC Payload 811C to the LAN switch, if the MAC Destination Address 811B is in the local LAN. Otherwise, the SL 810 checks the local table 812. If the MAC Destination Address 811B is found within local table 812, the OMWL Payload 810 is further forwarded to the corresponding OMWL address, by utilizing the unicast module. If the MAC Destination Address 811B is not found, the OMWL payload 810 is dropped.

Local table 812 is an address mapping table maintained locally at the BGL 800. In an embodiment, local table 812 can be used in supporting the micro mobility of LAN users. The micro mobility suggests that LAN users move from one LAN to a neighboring LAN, where the BGL 800 nodes of the two LANs are neighbors. When a new user enters the LAN, the SL 810 of the BGL 800 broadcasts a mobility management notice, by using the OMWL broadcast module. On receipt of the aforementioned mobility management notice, the SL 810 of the original LAN adds an entry in the local table 812, corresponding to the mobile LAN user. On adding the entry, the SL 810 also sets up a time stamp, which for example determines the time period that the BGL 800 will forward MAC packets for the mobile LAN user or denotes the time of their addition to the local table 812.

Figure 9:
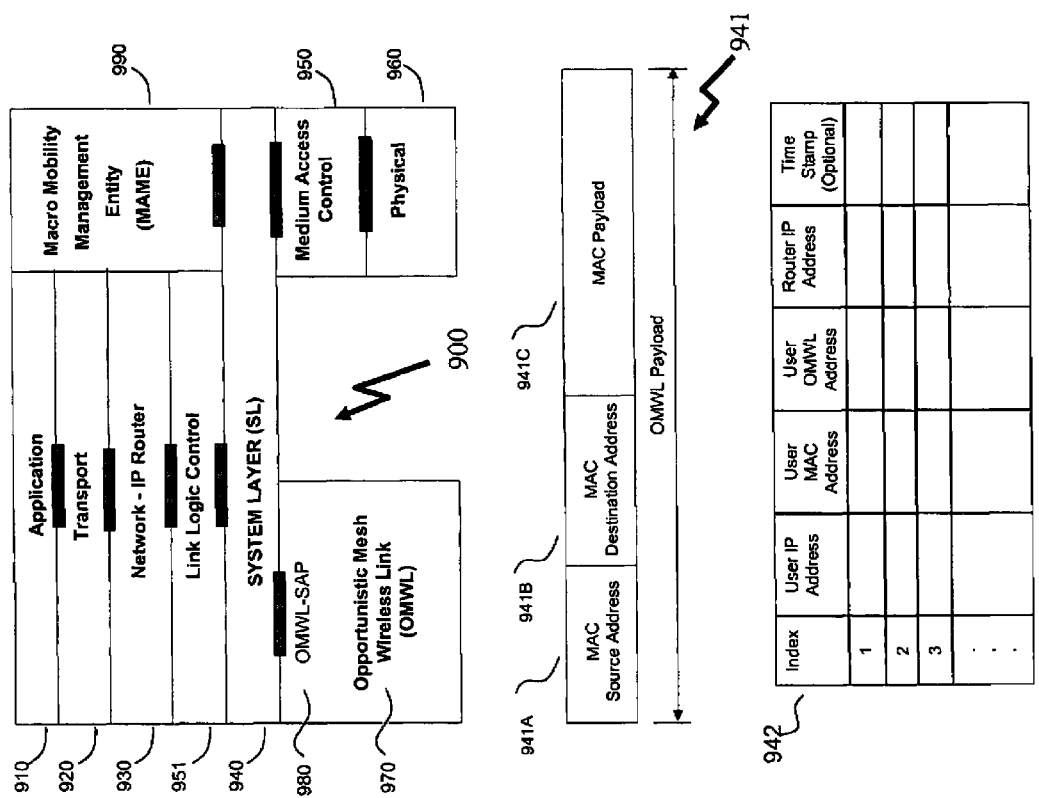
FIG. 9 shows an embodiment of a network border gateway (BGR), with an OSI based network router, according to the current invention.

Referring to FIG. 9 shown is another embodiment of a network border gateway 900 (BGR), where the BGR 900 is implemented with an OSI based router. Shown in FIG. 9 are the application layer 910, transport layer 920, and network IP router layer 930, wherein the implementations of these three layers 910 through 930 can be general and relating to OSI protocols. For example the Internet Protocols (IP) may be employed as the protocol of the network layer 930, and an IP address thereby as the network layer address. SL 940 is the System Layer of the BGR 900, which interfaces both the OSI based router of this embodiment and the OMWL 970. The OMWL 970 and the OMWL-SAP 980 are as described previously for elements OMWL 250 and OMWL-SAP 280 of the opportunistic mesh network architecture 290 for Node D 240 in FIG. 2A. The Medium Access Control (MAC) layer 950 and the physical layer 960 of the BGR 900 can similarly be general OSI based technologies. Also shown is an application layer agent, the Macro Mobility Management Entity (MAME) 990, which directly interfaces the SL 940 of the BGR 900. MAME 990 can be utilized for router access control, and the macro mobility management, where macro mobility suggests that a mobile user moves from the subnet of one router to the subnet of another router. The format of the OMWL payload 941 is the same as OMWL payload 811 in FIG. 8. The locally managed address mapping table 942, which can also be updated by MAME 990 through the interface, now contains additional fields related to the router IP address and user IP address.

The SL 940 of the BGR 900 implements the protocol translations as follows. On receipt of an OMWL payload 941 from the OMWL layer 970, which is decoded as a packed MAC payload, SL 940 first examines the MAC Source address 941A. If the MAC Source address 941A does not appear in the local address mapping table 942, the SL 940 talks to the MAME 990 deciding the identity of the source MAC. If the MAC Source address 941A is authenticated, or decided as an authenticated mobile user coming from another subnet, the SL 940 adds one more entry about the source user in the local address mapping table 942, including the user IP address, the user MAC address, the user OMWL address, and the local router IP address. In an embodiment, the MAME 990 may assign a new IP address to the mobile user. If the MAC Source address 941A is decided as an authenticated mobile user coming from another subnet, the MAME 990 may contact the MAME 990 of the aforementioned another subnet router, to establish the user's macro mobility rights. On receipt of the aforementioned macro mobility notification, the MAME 990 of the aforementioned another subnet router can set its local address mapping table 942, by updating the user IP address, the router IP address, and the user OMWL address. The aforementioned MAME 990 can also set up a time stamp in the entry of the local address mapping table 942, which for example determines the time period that the BGR 900 will forward IP packets for the roaming mobile user.

If the MAC Source address 941A from the received OMWL payload 941 appears in the local address mapping table 942, the SL 940 updates the OMWL address of the corresponding source entry. Thereon, the SL 940 examines the MAC Destination Address 941B of the received OMWL payload 941. If the MAC Destination Address 941B appears in the local address mapping table 942, the SL 940 forwards the OMWL payload 941 to the OMWL address of the destination, by using the unicast module. If the MAC Destination Address 941B is not found in the local address mapping table 942, the MAC payload is then forwarded to the Link Logic Control 951.

On receipt of a MAC Payload 941C from Link Logic Control 951, the SL 940 examines if the MAC Destination Address 941B is in the local address mapping table 942. If the MAC Destination Address 941B is in the local address mapping table 942, the SL 940 packs the MAC payload 941C as an OMWL payload 941, by filling the aforementioned MAC Destination Address 941B, and filling the router's MAC address as the MAC Source Address 941A. The packed OMWL payload 941 is sent to the OMWL address, as recorded in the local address mapping table 942, by the unicast module. If the MAC Destination Address 941B is not found in the local address mapping table 942, the MAC payload 941C is forwarded to the Medium Access Control 950.

On receipt of a MAC Payload 941C from the Medium Access Control 950, the SL 940 directly forwards the MAC payload 941C to the Link Logic Control 951.

Figure 10:
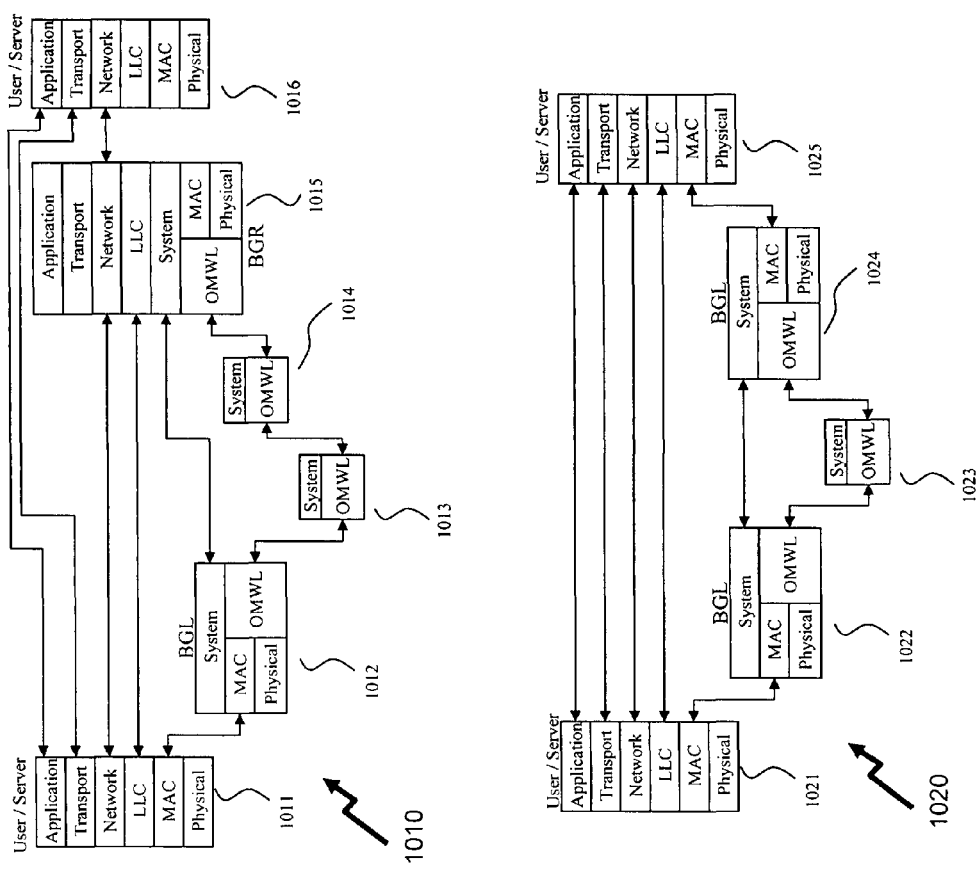
FIG. 10 illustrates two end-to-end communication paths for two OSI based user/servers according to embodiments of the invention, through the EWI based opportunistic mesh network.

FIG. 10 shows two possible end-to-end communication paths for two OSI based user/servers according to embodiments of the invention, through the EWI based opportunistic mesh network. In the first end-to-end communication path 1010, the first and second end user/servers 1011 and 1016 respectively communicate directly to each other on transport and application layers. The first end user/server 1011 communicates directly to a BGL device 1012, for example as described previously in FIG. 8, by a LAN technology, i.e., on MAC layers. And the second end user/server 1016 communicates directly to a BGR device 1015, for example as described previously in FIG. 9, by network routing, i.e., on network layers. The BGL device 1012 and BGR device 1015 communicate to each other on System layers, by the opportunistic mesh networking technology, via a pair of nodes 1013 and 1014.

In the second end-to-end communication path 1020, the first and second end user/servers 1021 and 1025 respectively communicate directly to each other on transport and application layers. The first and second end users/servers 1021 and 1025 communicating directly to first and second BGL devices 1022 and 1024 respectively, by LAN technologies, i.e., on MAC layers. The first and second BGL devices 1022 and 1024 communicating to each other directly on the system layers, or by the OMWL opportunistic mesh networking technology, via a node 1023.

Numerous other embodiments may be envisaged without departing from the spirit or scope of the invention.

What is claimed is:

1. A method of opportunistic data communications comprising the steps of:
    providing a data packet to a first node for transmission therefrom, the first node being identified by a first address;
    providing a plurality of second nodes; each second node being identified by a second address;
    providing an indication of the destination address of the data packet;
    determining at least an indication of a cost of data delivery to each second node within a current subset of the plurality of second nodes;
    determining opportunistically for the data packet whether to at least one of broadcast and unicast from the first node; wherein,
    upon determining to broadcast from the first node;
        broadcasting the data packet upon at least a wireless channel;
    and upon determining to unicast from the first node;
        determining opportunistically at least one second node of the current subset of the plurality of second nodes to transmit the data packet to based upon a predetermined cost decision; and
    transmitting the data packet from the first node to the at least one second node upon at least a wireless channel.

2. A method of opportunistic data communications according to claim 1 wherein;
    determining opportunistically to at least one of broadcast and unicast comprises determining opportunistically for each data packet in dependence upon at least a transmission criteria, the transmission criteria being at least one of establishing with the first node of a second address of at least one of the plurality of second nodes, establishing the cost of data delivery to at least one of the plurality of second nodes, receiving an acceptable wireless status of at least one of the plurality of second nodes, the first node address, the destination address, and receiving a management command.

3. A method of opportunistic data communications according claim 1 wherein;
    determining opportunistically the at least one second node comprises determining the at least one node in dependence upon at least updating the cost of data delivery to the current subset of second nodes and selecting the lowest cost of data delivery.

4. A method of opportunistic data communications according to claim 1 wherein;
    determining at least one of the cost of delivery and predetermined cost decision comprises determining the at least one of in dependence upon at least one of a first characteristic and a second characteristic, wherein
    the first characteristic relates at least one of the first and second nodes and is selected from the group comprising available battery power, size of the data packet to be transmitted, a measure of direction of movement of the node relative to another node of the current subset of second nodes, a measure of velocity relative to the other second node of the current subset of second nodes, and an indication that the cost of next data delivery from the one second node to another second node of the plurality of second nodes is lower than or equal to the cost of the data delivery from the first node to the one second node; and
    the second characteristic relates to a transceiver associated with one of the first and second nodes and is selected from the group comprising maximum potential output power of the transceiver, current output power setting, and transmission speed.

5. A method of opportunistic data communications according to claim 1 wherein;
providing an address for a node comprises determining an address for the node in dependence upon at least one of physical location coordinates of the node, a triangulation from a known set of landmarks, an application specific parameter, from data provided by a global positioning system, a number of relay hops to a landmark, an application specific parameter updated by an application running on a system layer of the node, a measure of mobility of the node, and for every data packet to be transmitted.

6. A method of opportunistic data communications according to claim 1 wherein;
determining the indication of the cost of data delivery to a second node comprises determining the cost of data delivery in dependence upon at least applying a formula comprising at least a term varying in dependence of a node characteristic, the node characteristic selected from a group comprising the first address, the second address, a measure of distance between the first node and second node, the destination address, a measure of distance between the second address and the destination address, the number of hops to at least one of a landmark and the destination, a wireless channel status indicator of the second node, and a response time of the second node to a request to send control message from the first node.

7. A method of opportunistic data communications according to claim 1 wherein;
providing at least one of the first node and a second node comprises providing a transceiver, the transceiver providing at least one of a broadcast capability and a unicast capability and having at least one of a fixed output power and a variable output power, the variable output power determined in dependence upon at least one of a measure of quality of service, the cost of data delivery to the opportunistically determined at least one second node, and the predetermined cost decision.

8. A method of opportunistic data communications according to claim 1 wherein;
each of the broadcasting and transmitting the data packet comprises initiating at least one node activity, the at least a node activity being selected from a group comprising transmitting the data and network management information in the form of a transmitted data packet, calculating at a receiving node a cost of data delivery, initiating a cost of data delivery transfer to the first node, acknowledging receipt of the broadcast data packet, failure to deliver the data packet, and transmitting the data packet with a predetermined unicast cost of data delivery.

9. A method of opportunistic data communications according to claim 1 wherein;
transmitting the data packet from the first node to the at least one second node in a upon at least a wireless channel comprises utilizing a message comprising at least one of a request to send message, a clear to send message, an acknowledge message, a data message, a quality of service indicator, and an address.

10. A method of opportunistic data communications according to claim 1 wherein;
transmitting the data packet comprises providing the data packet to a data radio, the data radio for transmitting at least a modulated wireless signal upon a selected channel from a plurality of predetermined channels.

11. A method of opportunistic data communications according to claim 1 wherein, determining opportunistically at least one of the at least one second node and current subset of the plurality of second nodes is made at least in dependence upon receiving indications of availability from at least one of the plurality of second nodes.

12. A method of opportunistic data communications according to claim 1 wherein, determining opportunistically for the data packet whether to at least one of broadcast and unicast from the first node is made at least in dependence upon at least an indication of availability of at least one second node of the plurality of second nodes.

13. A method of opportunistic data communications according to claim 1 wherein;
determining the predetermined cost decision comprises determining the predetermined cost decision at least one of for each data packet individually, in dependence upon only the basis of cost of data delivery, and in dependence upon a response time of the second node to a request to send control message from the first node.

14. A method of opportunistic data communications according to claim 1 wherein;
determining the at least one second node comprises determining the at least one second node in dependence upon a weighted combination of factors, the factors selected from the group comprising cost of data delivery, an available budget for data delivery determined in dependence upon a characteristic of at least one of the first node and a second node of the current subset of second nodes, a measure of quality-of-service of a connection between the first node and at least one second node of the current subset of second nodes, an indication of second nodes already tried with the data packet, and a commercial weighting.

15. A method of opportunistic data communications according to claim 14 wherein;
providing a commercial weighting comprises providing a weighting based upon the second node to which it applies being at least one of part of the same service provider network as the first node, part of a network comprising at least a part thereof outside a predefined geographical limit, part of an unsecured communications network, part of a network having a commercial agreement with the service provider network of the first node, and part of a network on a banned network list.

16. A method of opportunistic data communications according to claim 1 wherein;
transmitting the data packet comprises delaying the transmission of the data packet for a predetermined period of time determined in dependence upon at least one of a network management command, establishing that a delayed transmission will reduce the cost of data delivery, receiving no clear to send message in response to a request to send, and a status of the first node.

17. A method of opportunistic data communications according to claim 1 wherein;
determining the predetermined cost decision comprises determining that the cost of data delivery from the first node to the second node shall be less than or equal to the cost of data delivery to the first node from a preceding hop node.

18. A method of opportunistic data communications according to claim 1 wherein;
providing at least one of the first node and one of the plurality of second nodes comprises providing a border gateway; the border gateway for providing an interface between the network comprising the border gateway and another network, the another network operating according to at least one of the method of opportunistic data communications according to claim 1 and an open industry standard.

19. A method of opportunistic data communications according to claim 18 wherein;
providing the border gateway comprises providing a mapper, the mapper for at least one of translating between protocols of the network comprising the border gateway and the another network, mapping addresses between the network comprising the border gateway and the another network, implementing micro-user mobility management, and implementing macro-user mobility management.

20. A method of opportunistic data communications comprising the steps of:
providing a node of a plurality of nodes, each nodes identified by an address and capable of wirelessly communicating by at least one of transmitting and receiving a data packet upon one channel of a plurality of channels according to at least a standard and at least one of transmitting and receiving a pilot tone of a plurality of pilot tones;
receiving at the node a data packet for transmission, the data packet having associated a destination address other than the address of the node;
transmitting an indication of the availability of the data packet for transmission from the node using a first pilot tone, the pilot tone associated with at least one of the node and the one channel;
receiving an indication of an availability to receive the data packet from at least a second other node of the plurality of nodes, the availability indicated by receiving at least one of a second pilot tone and the address of the second other node, the second pilot tone associated with at least one of the second other node and the one channel;
providing at least one of an indication of an address and an indication of mobility associated with the at least a second other node of the plurality of nodes;
determining at least an indication of a cost of data delivery to at least each available second node within a current subset of at plurality of second nodes in dependence upon at least one of the address indication and mobility indication; and
determining opportunistically an action for the node for that data packet, the action one of broadcasting, unicasting, discarding, and temporarily storing the data packet; wherein
broadcasting the data packet upon at least the one channel upon determining opportunistically to broadcast without at least one of regard to and knowledge of the addresses of the plurality of nodes;
unicasting the data packet upon at least the one channel upon determining opportunistically to unicast, the unicast being to at least one second other node of the plurality of nodes in dependence upon at least one of a predetermined cost decision and a declared availability;
discarding the data packet upon determining opportunistically to discard the data packet, the determination based upon the cost of data delivery to any available second other nodes exceeds available funds; and
temporarily storing the data packet upon determining opportunistically to store the data packet for a predetermined period of time, the predetermined period of time established in dependence upon at least one of lowering the cost of data delivery to a selected second other node at least one of further and to below available funds.

21. A method of opportunistic data communications according to claim 20 wherein,
transmitting at least one of the first pilot tone and second pilot tone comprises transmitting at least one of a continuous CW frequency, a CW frequency for a predetermined period of time, and a control packet.

22. A method of opportunistic data communications according to claim 20 wherein,
determining at least one of the cost of delivery and predetermined cost decision comprises determining the at least one of in dependence upon at least one of a first characteristic and a second characteristic, wherein
the first characteristic relates at least one of the node and the second node and is selected from the group comprising available battery power, size of the data packet to be transmitted, a measure of direction of movement of the node relative to another node of the current subset of second nodes, a measure of velocity relative to the other second node of the current subset of second nodes, and an indication that the cost of next data delivery from the one second node to another second node of the plurality of second nodes is lower than or equal to the cost of the data delivery from the first node to the one second node; and
the second characteristic relates to a transceiver associated with one of the node and the second node and is selected from the group comprising maximum potential output power of the transceiver, current output power setting, and transmission speed.

23. A method of opportunistic data communications comprising the steps of:
providing a node of a plurality of nodes supporting transmission of at least a data packet on at least one data channel of a plurality of data channels according to a standard and capable of bidirectional communications relating to node status upon at least one message channel of a plurality of message channels, each message channel other than one of the plurality of data channels;
monitoring a predetermined set of the message channels to provide an indication of activity;
receiving a data packet for communication from the node;
transmitting the data packet according to the standard upon the indication of activity meeting a first predetermined criterion without regard to the plurality of message channels;
transmitting the data packet according to an opportunistic method upon the indication of activity meeting a second predetermined criterion, the opportunistic method including a decision as to whether at least one of opportunistically broadcast and opportunistically unicast from the node for the data packet; wherein, opportunistically broadcasting comprises broadcasting the data packet without at least one of regard to any addresses of the plurality of nodes and knowledge of the plurality of second addresses upon at least a data channel; and
opportunistically unicasting comprises determining at least one other node of the current plurality of nodes to transmit the data to based upon a determined cost of data delivery to the one other node meeting a predetermined cost decision and transmitting the data packet from the node to the at least one determined other node upon at least a data channel.

24. A method of opportunistic data communications according to claim 23 wherein,
determining the other node of the plurality of nodes comprises transmitting a request-to-send signal on a first message channel of the plurality of message channels and determining the presence of a clear-to-send signal on at least one second message channel of a plurality of second message channels, each of the request-to-send and clear-to-send signals being other than digital data.

25. A method of opportunistic data communications according to claim 24 wherein, the first message channel and second message channel of the plurality of message channels are associated with the same data channel of the plurality of data channels; and the plurality of message channels are unmodulated frequency tones.

* * * * *